United States Patent Office 3,452,110
Patented June 24, 1969

3,452,110
METHODS OF TREATING USED DRY CLEANING SOLVENTS
Warren K. Cooley, Brookeville, Md., and Ralph T. Mease, Washington, D.C., assignors to Caled Products Company, Inc., Brentwood, Md., a corporation of Maryland
No Drawing. Original application Nov. 5, 1963, Ser. No. 321,418, now Patent No. 3,360,474 dated Dec. 26, 1967. Divided and this application Dec. 7, 1967, Ser. No. 714,375
Int. Cl. C07c *21/00;* C10g *17/10;* D06l *1/10*
U.S. Cl. 260—654         5 Claims

ABSTRACT OF THE DISCLOSURE

Dry cleaning solvents containing impurities accumulated from continued use are purified by the addition thereto of an additive comprising a filtering powder, a polyhydroxy alcohol and an alkaline material, thoroughly agitating the solvent-additive mixture and then filtering the same.

---

This application is a division of my application Ser. No. 321,418, filed Nov. 5, 1963, now U.S. Pat. No. 3,360,474.

This invention relates to methods for treating dry cleaning solvents to remove therefrom impurities which have accumulated and built up in the solvents on continued use, and to the compositions used in such methods.

In the cleaning of clothes and other textiles generally, hereinafter broadly referred to as "garments," the garments are washed in an organic solvent. These solvents usually are petroleum distillates or halogen-containing synthetic solvents. Those conventionally used include Stoddard Solvent, 140F. solvent, "fast drying solvent," chlorinated solvents, as typified by perchlorethylene or fluorine-containing synthetic solvents. Stoddard Solvent and "fast drying solvent" are petroleum distillates having a flash point of about 106° F. The "fast drying solvent" differs from Stoddard Solvent essentially in that it does not include some of the higher boiling fractions. 140F. solvent is a petroleum distillate having a minimum flash point of 140° F.

In the dry cleaning operation the garments are agitated in the dry cleaning fluid for a period of time with a continuous filtration process, are then extracted by centrifugal action, then air dried and pressed, if required.

The dry cleaning solvent performs two primary functions. Firstly, it washes out from the garments particles such as sand and other insoluble-type material, known commonly as "soil." Secondly, it removes from the garments those impurities which are soluble in the dry cleaning solvent. The solvent used in the cleaning operation and extracted by the centrifugal drying is filtered before reuse, but the soluble substances removed from the garments remain in the solvent and, after repeated use, the solvent becomes discolored and charged with impurities to an extent that the garments, after the cleaning operation, will still contain a significant percentage of soluble impurities and the color of the garment may be adversely affected.

Various methods have been heretofore proposed for treating used solvents to remove undesirable soluble impurities. The use of "filter powders" such as diatomaceous earth and of activated carbon in the filtering operation is not uncommon, and additives for the solvent before filtering to effect a chemical reaction with some of the impurities are marketed under various trade names. These additives consist usually of alkaline materials such as soda-ash, lime, and alkaline-earth compounds. The use of these expedients does somewhat prolong the period that the solvents may be used with satisfactory results, but today there is no known treatment which removes enough of the objectionable soluble impurities, or sufficiently improves the color of the solvents to significantly prolong the period of use of the solvent.

By the method of this application a much larger portion of the objectionable soluble impurities removed from the garment by the dry cleaning process is removed from the solvent, and the color of the solvent is also greatly improved.

The essential feature of this method is the formation in the solvent of a colloidal suspension which, in effect, collects the impurities in the solvent and which can then be removed by filtration. Various liquids which are miscible with the solvents but not soluble therein will, when added to the solvent, form a colloidal suspension which will attract to itself or occlude some of the impurities present in the solvent without chemical treatment of the solvent and will also attract or occlude a much larger percentage of the products resulting from the reaction of the additives than will be removed by present methods of filtration following the addition of the alkalies or the chemicals.

In treating used solvent by the method of this application, the procedure which has at this date been found most effective, there is added to the used solvent a mixture consisting of 44 parts diatomaceous earth, 56 parts ethylene glycol containing 3% sodium carbonate in solution, 20 parts soda-ash and 20 parts slaked lime, all parts being by weight.

The mixture is added to the used solvent in the proportion of our to eight pounds of the mixture to 100 gallons of used solvent and then run in the washer for 15 or 20 minutes to thoroughly agitate the mixture. The mixture is then run through the filter and returned to the washer. The process may then be repeated if desired.

The diatomaceous earth serves its usual function of a filter aid. The ethylene glycol solubilizes and agglomerates materials which are wetted by it and are more soluble in it than in the dry cleaning solvent. It is chemically unaltered in the process and is removed by the filter. It forms in the solvent a colloidal suspension, and if added to the used solvent without the alkalies or other chemicals, effects a significant improvement in the solvent, particularly as regards color. It is believed that there are reaction products resulting from the addition of the alkalies as heretofore used which are soluble in the solvents and therefore not removed by filtering, and that these products are attracted to the colloidal suspension resulting from the addition of the ethylene glycol. It is also probable that in the presence of the ethylene glycol, reactions take place which do not in the non-aqueous solvent, but whatever may be the precise effect of the added ethylene glycol or other polyhydroxy alcohol, a much greater purification of the solvent is obtained than by any previously used process.

Other polyhydroxy alcohols which have been found effective are: diethylene glycol, propylene glycol, glycerine, triethylene glycol.

It is believed that any anhydrous liquid which is insoluble in the solvent but miscible with the solvent, chemically inert and has physical characteristics similar to those of the above-mentioned polyhydroxy alcohols and will form in the solvent a colloidal suspension which will collect such soluble impurities as are wetted by the suspension and effect their removal by filtration.

While the nature and relative proportions of the soluble impurities in used dry cleaning solvents vary considerably, fatty acids and soaps usually make up a major proportion of the impurities and before and after quantitative analyses for these two types of impurities, and before and after color comparisons, furnish a substantially accurate measure of the effectiveness of the intermediate treatment.

The analysis of a sample of used solvent from a fairly large dry cleaning establishment serving the general public in a large city indicated a fatty acid content of .314% and a soap content of 1.10%. The sample was so discolored that it was no longer safely useable for light-colored garments.

After the first treatment by the procedure above described, the fatty acid content was reduced to .114% and the soap to .77%. The color was also significantly improved. After the second treatment, the analysis showed no fatty acid and the soap was reduced to .19%, and the solvent was substantially colorless.

The proportions of the several substances making up the preferred composition are not critical and may be varied at least plus or minus 25% without significantly affecting the results.

If double the quantity of the composition be added to the solvent for the first treatment a greater reduction in the fatty acid and soap content will be obtained than by the first treatment with the quantity above stated, but the results obtained with the double quantity one step process are not quite as good as with the two step process.

It will, of course, be understood that other alkalies and other filter aids, particularly those now used in the dry cleaning industry, may be substituted for those mentioned above, and that the process may be otherwise modified within the scope of the appended claims.

We claim:
1. The method of treating used dry cleaning solvents to remove impurities therefrom which comprises adding to the solvent a mixture of a polyhydroxy alcohol, an alkaline material and a filter powder, agitating the admixture to form a colloidal suspension in the solvent, and removing the suspension from the solvent by filtration.
2. The method of claim 1 wherein the filter powder is diatomaceous earth.
3. The method of claim 1 wherein the polyhydroxy alcohol is ethylene glycol.
4. The method of claim 1 wherein the alkaline material is sodium carbonate.
5. The method of claim 1 wherein the alkaline material is calcium oxide.

References Cited

UNITED STATES PATENTS

| 2,041,763 | 5/1936 | Heckman | 210—75 |
| 2,773,919 | 12/1956 | Millikan | 208—291 X |

FOREIGN PATENTS

| 1,228,293 | 3/1960 | France. | |

MICHAEL E. ROGERS, *Primary Examiner.*

U.S. Cl. X.R.

8—142; 208—180, 181; 210—21